United States Patent
Shoemake et al.

(10) Patent No.: US 7,272,156 B2
(45) Date of Patent: Sep. 18, 2007

(54) PHASED TRANSMIT ARCHITECTURE

(75) Inventors: Matthew B. Shoemake, Allen, TX (US); Harshal S. Chhaya, Plano, TX (US); Michele B. Gammel, Lewisville, TX (US); Khaled Turki, Tunis (TN)

(73) Assignee: Texas Instruments Incorporated, Dallas, TX (US)

( * ) Notice: Subject to any disclaimer, the term of this patent is extended or adjusted under 35 U.S.C. 154(b) by 1033 days.

(21) Appl. No.: 10/167,273

(22) Filed: Jun. 11, 2002

(65) Prior Publication Data

US 2003/0231650 A1 Dec. 18, 2003

(51) Int. Cl.
*H04J 3/16* (2006.01)
(52) U.S. Cl. .................................... 370/469
(58) Field of Classification Search ............... 370/231, 370/338, 395.21, 349, 464–476

See application file for complete search history.

(56) References Cited

U.S. PATENT DOCUMENTS

| | | | |
|---|---|---|---|
| 5,307,345 A | 4/1994 | Lozowick et al. | |
| 5,307,348 A | 4/1994 | Buchholz et al. | |
| 6,091,707 A | 7/2000 | Runaldue et al. | |
| 6,999,443 B1* | 2/2006 | Kuskin et al. | 370/338 |
| 7,039,068 B1* | 5/2006 | Halasz | 370/473 |
| 2004/0120292 A1* | 6/2004 | Trainin | 370/338 |

FOREIGN PATENT DOCUMENTS

| | | |
|---|---|---|
| EP | 0 604 341 A | 6/1994 |
| EP | 0 788 257 A | 8/1997 |
| EP | 1372305 | 12/2003 |

* cited by examiner

*Primary Examiner*—Doris H. To
*Assistant Examiner*—Feben Micael Haile
(74) *Attorney, Agent, or Firm*—Steven A. Shaw; W. James Brady; Frederick J. Telecky, Jr.

(57) ABSTRACT

A Phased Transmit Architecture that allows the embedded processor of an IEEE 802.11e wireless communication device to have a significant number of additional cycles between decoding of a QoS frame and the deadlines for generating a response transmission.

18 Claims, 4 Drawing Sheets

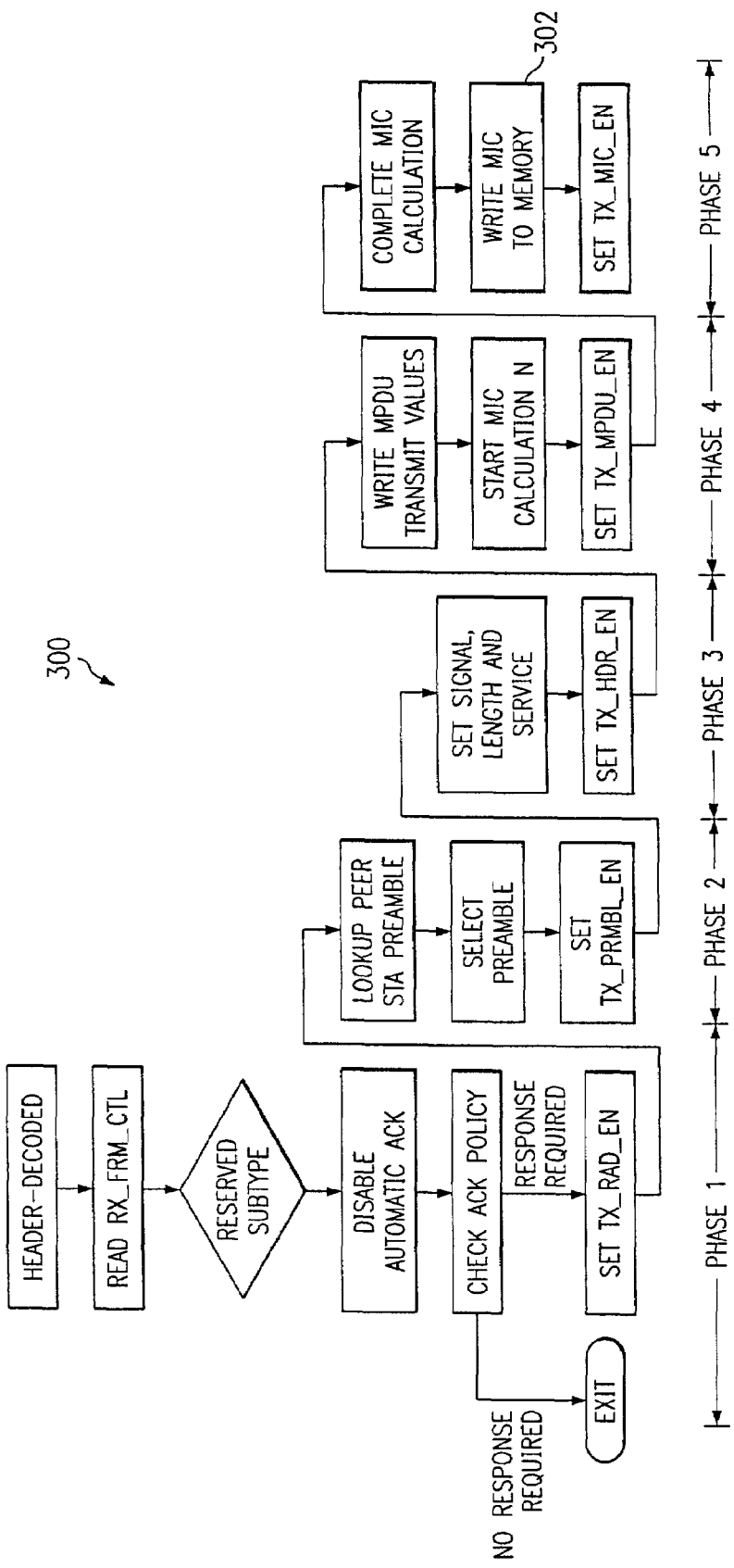
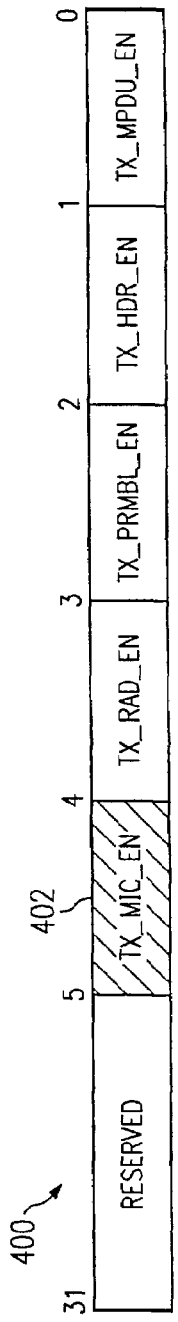
FIG. 5
FIG. 6

PHASED TRANSMIT ARCHITECTURE

BACKGROUND OF THE INVENTION

1. Field of the Invention

This invention relates generally to wireless communication systems, and more particularly, to a phased transmit architecture that allows a polled station or mobile station to transmit a frame response within the a short turn-around time while still maintaining ample time for computation of various decisions that must be made related to the transmitted frame. The invention is particularly useful and relevant to packet based wireless local area networks such as IEEE 802.11-based networks.

2. Description of the Prior Art

Modem wireless local area networks are packet based networks designed to move data packets from one wireless station to another. Typically, modem wireless local area networks used a distributed access channel access mechanism that allows each station on the network to attempt the transmission of data without being explicitly given a transmit opportunity by any central control entity on the network. Such a scheme yields no critical timing paths, as the transmitting station can take as much time as it needs to initialize and configure itself for transmission. Such networks may require the transmission of acknowledgement packets after the successfully reception of a data packet. The generation of such an acknowledgement packet is typically done in an automatic fashion, as it is the only possible response to an incoming frame addressed to the receiving station. Thus a receiving station has only two possible responses to an incoming frame: transmit an acknowledgement frame or transmit nothing at all.

SUMMARY OF THE INVENTION

The present invention is called the Phased Transmit Architecture (PTA). The PTA is an architecture for packet based wireless networks that allows a complex set of decisions to be made by the receiving station while minimizing the complexity of the hardware required and maximizing the processing power available for time critical operations.

The PTA allows wireless communication stations to quickly make complex decisions while receiving a frame from another station. In networks that implement complex protocols where the number of possible responses to an incoming frame is not trivial, the PTA is particularly useful.

In packet based wireless communication systems, there is typically a short interframe spacing (SIFS). The SIFS is the length of time after the reception of an incoming packet by which the receiving station must initiate a return transmission, if the protocol mandates such a transmission. Additionally, in such systems the packets are generally composed of multiple components. Each component has its own set of parameters that must be determined. The PTA is an architecture that allows the-for the initiation of packet transmission before all parameters for each component of the packet are known and allows for parallel determination of parameters required for components of the packet while other components are being transmitted. This architecture thus maximizes the amount of time available for determination of each components parameter and allows for support of a small SIFS value, which in turn maximizes network throughput.

The PTA is particularly useful in the implementation of complex MAC layer protocols such as the IEEE 802.11e Wireless Local Area Networking standard. One embodiment of the invention is directed to a method of generating an outgoing data packet in IEEE 802.11e based networks. In such a network the packets contain the following components: PLCP preamble, PLCP header, and MPDU. In such a network the PTA allows for response to a received QoS frame by processing the incoming frame and determining if a response frame must be initiated. If a response frame is required, the PTA allows for generation and initiation of transmission of proper transmit PLCP preamble within a SIFS time. During transmission of the PLCP preamble, the PTA allows for calculation of parameters required for the PCLP header prior to the point in time when they are need for transmission. Similarly the PTA allows for calculation of parameters required for the MPDU prior to the point in time when they are required for transmission. This calculation may also be done in parallel with transmission of the PLCP preamble and/or PLCP header.

The calculation of parameters for each component is typically done in an embedded processor, but may also be performed by other means such as dedicated hardware for the calculation of each parameter.

When an embedded processor is used, the PTA allows the embedded processor to have a significant number of additional cycles for calculation of parameters when compared to other architectures that require calculation of all parameters prior to transmit.

BRIEF DESCRIPTION OF THE DRAWINGS

Other aspects, features and advantages of the present invention will be readily appreciated, as the invention becomes better understood by reference to the following detailed description, when considered in connection with the accompanying drawing figures wherein:

FIG. 5 is a flowchart illustrating a phase transmit architecture according to another embodiment of the present invention; and FIG. 6 illustrates a Phased Transmit Enable Register associated with a polled station according to another embodiment of the present invention.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
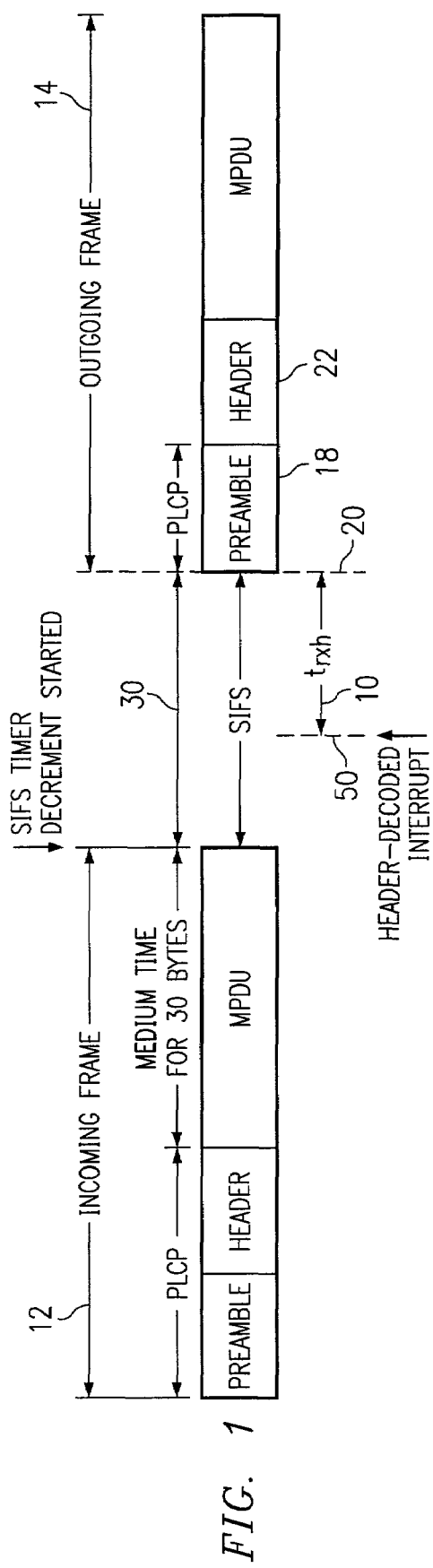
FIG. 1 is a timing diagram illustrating a general timing relationship between an incoming frame and a response frame.

FIG. 1 is a timing diagram illustrating a general timing relationship between a received frame and a response frame. The time available to the MAC to decode the incoming frame 12, select the outgoing frame 14, setup and start a transmission is $t_{rxh}$ 10. A typical time between the end of the received frame and the start of a transmission (SIFS) is 10 µs. The physical layer decoding may take a significant portion of the SIFS, e.g. µs, thus MAC layer processing and transmit enable must be completed in $t_{rxh}$ which may be as low as 2 µs. Assuming an embedded processor cycle period of $T_{eCPU}$=1/44 MHz, this allows only $t_{rxh}/T_{eCpU}$=88 cycles to perform all of these operations required to determine if the transmit of a response frame is required, and if so to calculate parameters required for the transmission and to enable the transmission. For complex MAC protocols such as the IEEE 802.11e MAC protocol, such a small number of cycles does not enable compliance with the protocol. The invention allows for computations required for the MAC protocol without unnecessarily decreasing $T_{eCPU}$. Note that increasing $T_{eCPU}$ is often not desirable, as when the embedded CPU was not in the critical receive-to-transmit timing path, the extra cycles would not be required.

As stated herein before, the MAC layer of the receiving station has only a short amount of time, e.g. a fraction of the SIFS time ($t_{rxh}$ 10), to respond to the incoming frame 12. Such a small amount of time is insufficient in current architectures to perform all of the required tasks. Moreover, in these current architectures, all the transmit parameters must be calculated and typically written into the appropriate registers before starting the frame transmission. The Phased Transmission Architecture (PTA), discussed in detail below with reference to FIGS. 2-6, alleviates this timing restriction by breaking the frame transmission into multiple steps.

In the PTA, PLCP preamble 18 transmission can be initiated before the final frame selection has been made; because the preamble 18 data is not a function of the data to be transmitted. Only when the PLCP header 18 transmission is complete must the frame selection be complete and hardware registers be loaded with the information about the selected frame. During transmission of the PLCP preamble, PLCP header parameters are determined and loaded into the hardware registers. The PLCP preamble is typically a training sequence used by the physical layer to estimate channel characteristics, detect the start of a packet, etc.; thus it contains no information that is a function of the PLCP header of the MPDU.

In some current architectures, an MPDU Ready bit (MPDU_RDY) is used to indicate that all calculations required for transmission have been made. This MPDU_RDY bit typically resides in a Transmit Enable Register. In current architectures, the MPDU_RDY bit is used to indicate that all parameters required for transmit have been loaded into various transmit registers. In current architectures, these registers must all be loaded prior to assertion of the MPDU_RDY bit.

In the PTA, required transmit values are portioned in to those registers required for various phases of the transmit. Those skilled in the art will realize that the partition may be made in various ways. The PTA applies to all such partitions.

A typical partition of the values required for transmit would be those required for the enabling a radio for transmit, the PLCP preamble type, the PLCP header information and the MPDU information. This partitioning is one preferred embodiment. A register group is assigned to each partition, e.g. a PLCP preamble register group is assigned to contain all values required to initial the transmission of the PLCP preamble. To implement this preferred embodiment additional bits are defined for use in Transmit Enable Register to indicate when various transmit register groups are valid.

Those skilled in the art will recognize that how the transmit information for each group is stored is not key to the invention, e.g. the data for each group could be stored into another form of memory other than a register bank.

Figure 2:
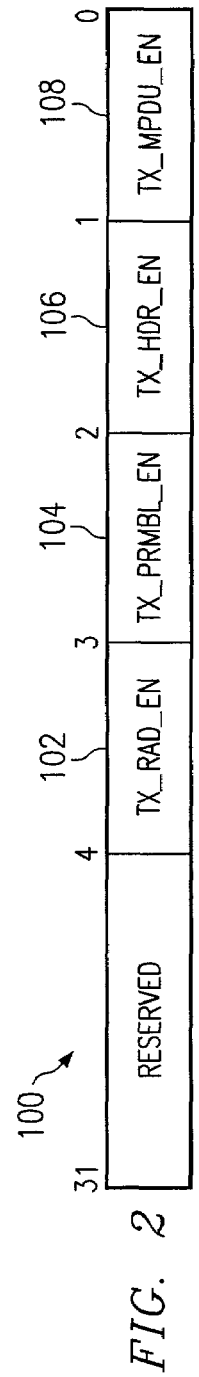
FIG. 2 illustrates a Phased Transmit Enable Register used in one embodiment of the present invention.

FIG. 2 illustrates a Transmit Enable Register 100 according to the embodiment of the present invention discussed above. The transmit radio enable bit, TX_RAD_EN 102, indicates to the hardware that a transmit is being initiated. The setting of this bit is meant to allow for radio turn around from receive mode to transmit mode prior to the start of the preamble 18 transmission. This bit may be set by the hardware of eCPU once it is determined that a transmit will be initiated. The transmit preamble enable bit, TX_PRMBL_EN 104, indicates to the hardware that the register group for the PLCP preamble have been loaded, e.g. long or short preamble for 802.11 devices. The register group for the PLCP preamble is typically one register, e.g. the PREAMBLE-SELECT Register (discussed herein below with reference to FIG. 4). In an 802.11 system, this bit and the TX_PREMABLE_EN bit must be set prior to expiration of the SIFS time to enable transmission of the preamble 18. The transmit header enable bit, TX_HDR_EN 106, indicates to the hardware that all values have been loaded into the PLCP header register group which contains all information required to properly format the PLCP header. The transmit MPDU enable bit, TX_MPDU_EN 108, indicates to the hardware that the remainder of the transmit values, i.e. the MPDU register group, have been loaded including the pointer to the MPDU data to be transmitted. Each bit in the new TRANSMIT-ENABLE register 100 has a specific timing associated with it that allows for additional calculation time for various transmit registers.

Figure 3:
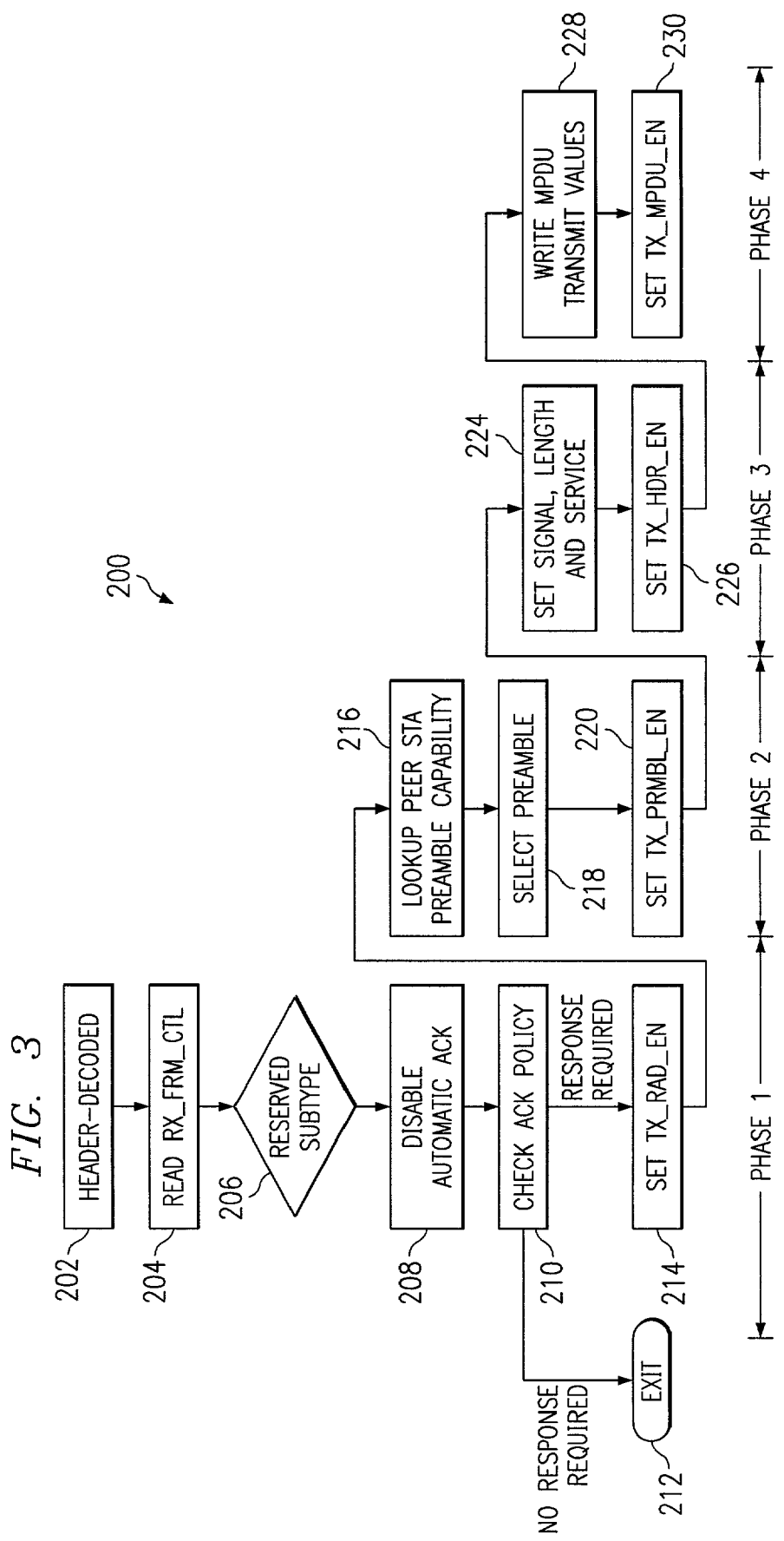
FIG. 3 is a flowchart illustrating a phased transmit architecture according to one embodiment of the present invention.

FIG. 3 is a flowchart illustrating the time critical tasks to be performed for a phased transmit architecture (PTA) 200 according to one embodiment of the present invention. One embodiment of the PTA 200 can be seen to have 4 phases (Phase 1-4) discussed in detail below.

Those skilled in the art will realize that the multiple phases of the PTA may be collapsed into a smaller number of phases. The smallest number of phases that may be used is 2. Collapsing the number of phases to one is equivalent to the current architectures which require all transmit information to be calculated prior to transmit.

Phase 1:

HEADER-DECODED 202 is the start point and occurs when the header of in incoming frame has been successfully decoded. HEADER-DECODED typically processes address filtered frames, depending thus if the received frame is not for this station, the BEADER-DECODED state will never be entered and no frame transmission will be generated by the station.

Read RX_FRM_CTL 204 indicates that the device should read the control field from the frame header. This value is typically loaded into a register, thus Read RX_FRM_CTL is done by reading a register that was loaded with the incoming frame control field; and if the decoded incoming frame 12 is of subtype "reserved" 206, that indicates the frame is a QoS frame.

If the control frame is not of subtype "QoS", then automatic acknowledgement hardware is used to automatically generate and transmit a standard acknowledgement frame and the flowchart is exited. If the received frame 12 is of subtype "data" (QoS), the automatic transmission of a standard acknowledgement frame must be disabled 208 by the embedded firmware. However, if the hardware is decoding the frame type as a QoS frame, the hardware could also disable the automatic ACK bit 208.

The QoS control field is the read to determine whether the frame needs a response 210, 212; all QoS frames need a response to the exception of QoS-ACK, QoS-Data+ACK with no-ack bit set, and QoS-Data with no-ack bit set. When a response is required, the TX_RAD_EN bit 102 in Transmit Enable Register 100 is set to enable the radio for transmission 214. Based on the TX_RAD_EN bit being set, the system can prepare the radio for transmit. The PTA then proceeds to Phase 2.

Phase 2:

Phase 2 of the PTA 200 begins by looking up the peer station preamble capability 216. This mechanism could be implemented, for example, via a lookup table that contains the MAC address of the stations in the BSS with their preamble capability. This information must be maintained in memory by the hardware eCPU by writing to the PREAMBLE_SELECT register (depicted in FIG. 3), represented in block 218, and waiting for SIFS 220. Phase 2 is then completed by setting the TX_PRMBL_EN bit 104 in the Transmit Enable Register 100 to enable the baseband processor to start the transmission of the appropriate frame preamble 18 at the SIFS boundary 20 as depicted in block 222.

Phase 3:

Phase 3 of the PTA 200 begins by first selecting an MPDU for transmit and then loading the transmit registers with the header parameters specific to the selected MPDU, such as the transmission rate, frame length and transmission service (CCK, PBCC, OFDM) as seen in block 224. Phase 3 is then completed by setting TX_HDR_EN 106 in the Transmit Enable Register 100, which then allows for successful transmission of the frame header 22 after the transmission of the frame preamble is completed.

Phase 4:

Phase 4 then completes the PTA 200 by writing the remainder of transmit registers as for a normal transmission as represented by block 228. Finally, the PTA 200 is completed by setting TX_MPDU_EN 108 in the Transmit Enable Register to enable transmission of the MPDU after the frame header 22 is successfully transmitted.

Figure 4:
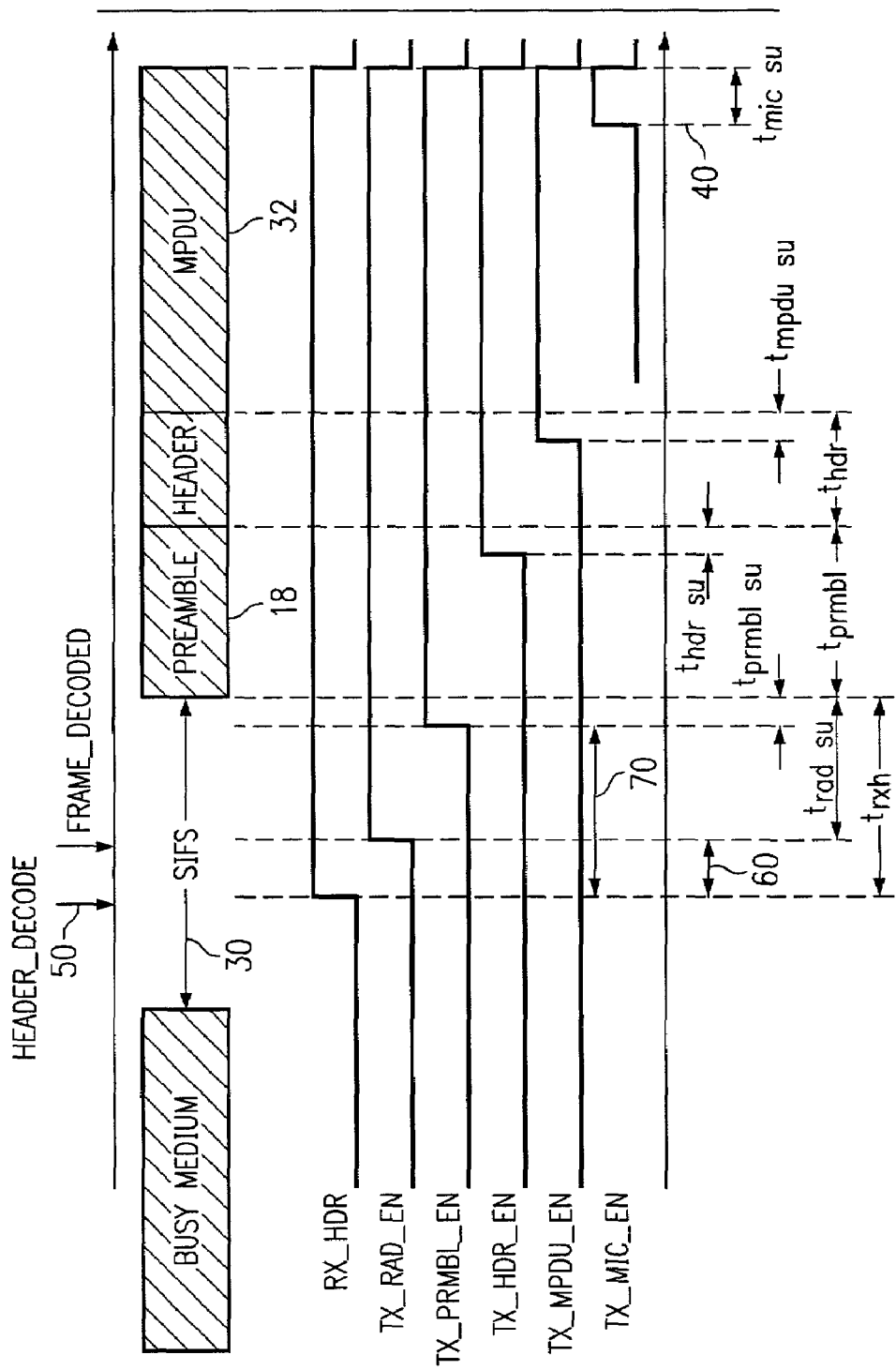
FIG. 4 is a timing diagram for a phased transmit architecture showing an incoming frame and the station response within a SIFS time according to one embodiment of the present invention.

FIG. 4 illustrates the timing of the PTA 200 in the case of an incoming frame 12 and the station response within a SIFS time 30. The first bit of the frame preamble 18 has been chosen as the reference time. Table 1 explains the timings and their corresponding phases.

The PTA 200 can also be extended to enable calculation of any values that typically come at the end of the MPDU transmission, such as the Message Integrity Check (MIC) value that may be used for security purposes. As a preferred embodiment, consider a 64-bit MIC value that is calculated as a function of the MPDU data 32. The MIC is similar to the 32-bit CRC; but due to its non-linearity, it prevents certain types of replay attacks. Forcing the MIC to be calculated prior to the start of MPDU 32 transmission may not allow enough time to calculate the MIC for longer MPDU's. Further, calculating the MIC prior the MPDU 32 transmission requires the MIC to be calculated in a fixed amount of time and therefore a fixed number of eCPU cycles. Allowing the MIC to be calculated on the data as the data is being transmitted allows more time for transmission and makes the calculation time available to calculate the MIC a function of the MPDU 32 length. The MIC must then be written in to the proper memory location prior to the point in time at which the MAC automatically reads the MIC from memory and writes it to the PRY. The MIC is typically near the end of the MPDU 32; so defining a deadline by which the MIC must be written into memory prior to the point in time at which the MAC automatically reads the MIC from memory and writes it to the PHY, so that it may be properly transmitted makes sense. With continued reference to FIG. 4, $t_{mic}$ 40 is the deadline for calculating the MIC and making it available for transmission.

FIG. 5 is a flowchart illustrating a phase transmit architecture 300 according to another embodiment of the present invention, and shows that it may be necessary for timing reasons to ensure that calculation of the MIC is started on N bytes of the MPDU 32 to make sure there are no memory access bottlenecks and/or to make sure the MIC can be available for small MPDU's. Those skilled in the art will readily appreciate whether or not this is necessary is dependent on the overall system architecture.

FIG. 6 illustrates a transmit Register 400 with a MIC Enable bit 402 associated with a polled station hardware according to another embodiment of the present invention. When the MIC is written into memory as represented in block 302 in FIG. 5, the TX_MIC_EN bit 402 should be written to, thereby indicating to the hardware that a valid MIC is available in memory. The TX_MIC_EN bit 402 is most preferably associated with bit 5 of the TRANSMIT-ENABLE Register 100. The QoS device most preferably should perform error checking by verifying that the appro

TABLE 1

Phased Transmit Architecture Timing

| Time | Description |
|---|---|
| $t_{rxh}$ | Denotes the time between the HEADER-DECODED interrupt and the start of a preamble transmission by the PHY. In the current implementation, this value is in the order of 2 μs. |
| $t_{rad\ su}$ | Denotes the radio setup time before preamble transmission. |
| $t_{rxh}$-$t_{rad\ su}$ | Represents the total length in time of phase 1 described above. |
| $t_{rad}$-$t_{prmbl}$ | Represents the total length in time of phase 1 and 2 described above. |
| $t_{prmbl\ su}$ | Denotes the setup time between the time TX_PRMBL_EN bit is set in TRANSMIT_ENABLE and the time the actual preamble transmission starts on the air. |
| $t_{hdr\ su}$ | Denotes the setup time prior to transmission of the header. The time by which the TX_HDR_EN bit is set in TRANSMIT_ENABLE prior to transmission of the actual header. |
| $t_{hdr}$ | The actual transmit time for the header. For 802.1 lb long preamble, 48 μs. For 802.1 lb short preamble, 24 μs. For 802.11a, 4 μs. |
| $t_{mpdu}$ | Denotes actual time to transmit the MPDU. | priate bit in TRANSMIT-ENABLE Register 100 is set prior to utilization of values that are indicated valid by the associated bit. If a bit is not asserted by the appropriate time, a TX error most preferably should be declared. If there is no error checking, i.e. the hardware assumes that all timings are met, it can be appreciated there is no need for the firmware to write the values in TRANSMIT-ENABLE 100. The type of transmit error can also be indicated in hardwire, e.g. a register, to provide access for easy debugging of firmware timing issues.

The IEEE 802.11e standard may require fragmentation of the MPDU 32 to meet the transmit opportunity. Consideration must also be given then as to whether or not fragmentation of MPDUs should be moved from the driver (hardware) to the firmware and to allow the firmware to be modified to allow real-time fragmentation of a MPDU 32.

The PTA 200, 300 then will allow more processing to take place while the PHY preamble 18, the PHY Header 22 and an MPDU 32 transmission are under way. This processing however, is time critical. With continued reference to FIGS. 2 and 4, it can be seen that all firmware action is triggered by the HEADER-DECODED interrupt 50. Following the HEADER-DECODED interrupt 50, there are four critical deadlines that are required to be met. When designing the hardware, the HEADER-DECODED interrupt 50 should be pulled-in time-wise as far as possible to increase the number of instruction cycles available for eCPU calculations, where $t_{cpu}$ denotes the clock period of the eCPU. The four deadlines associated with the PTA 200 are now described below with respect to the HEADER-DECODED interrupt 50. A fifth deadline associated with implementing the PTA 300 is also described.

Deadline 1:
The time available to execute Phase 1, discussed herein before with respect to FIG. 5, i.e. decide on a transmission and set the radio, is $(t_{rxh}-t_{rad\ su})$ 60 shown in FIG. 4. This translates to $(t_{rxh}-t_{rad\ su})/t_{cpu}$ cycles.

Deadline 2:
The cumulative amount of time available to execute Phase 1 and Phase 2 is $(t_{rxh}-t_{prmbl\ su})$ 70 shown in FIG. 4. This translates to $(t_{rxh}-t_{prbl\ su})/t_{cpu}$ cycles.

Deadline 3:
The cumulative amount of time available to execute Phase 1, Phase 2 and Phase 3 is $(t_{rxh}+t_{prmbl}-t_{hdr\ su})$ shown in FIG. 4. This translates to $(t_{rxh}+t_{prmbl}-t_{hdr\ su})/t_{cpu}$ cycles.

Deadline 4:
The cumulative amount of time available to execute Phase 1, Phase 2, Phase 3 and Phase 4 is $(t_{rxh}+t_{prmbl}+t_{hdr}-t_{mpdu\ su})$ all shown in FIG. 4. This translates to $(t_{rxh}+t_{prmbl}+t_{hdr}-t_{mpdu\ su})/t_{cpu}$ cycles.

Deadline 5:
The cumulative amount of time available to execute Phase 1, Phase 2, Phase 3, Phase 4, all shown in FIGS. 3 and 5, and Phase 5, depicted in FIG. 5, is $(t_{rxh}+t_{prmbl}+t_{hdr}-8*N_{MPDU}/R-t_m$ shown in FIG. 4, where $N_{MPDU}$ is the number of bytes in the MPDU 32 and R is the data rate in Mbps. This translates to $(t_{rxh}+t_{prmbl}+t_{hdr}-8*N_{MPDU}/R-t_{mic\ su})/t_{cpu}$ cycles. In the overall system architecture, $t_{mic\ su}$ should be minimized to maximize the number of cycles available. Table 2 below summarizes the PTA 200, 300 critical timing requirements according to one embodiment of the present invention discussed herein before.

TABLE 2

Critical Time Summary

| Cycles Prior to Deadline | | | | | | | | prmbl_su |
|---|---|---|---|---|---|---|---|---|
| Deadine 1 | Deadline 2 | Deadline 3 | Deadline 4 | Deadline 5 | TeCPU (ns) | trxh (us) | trad (us) | (us) |
| Long Preamble, 44 MHz 1 Byte Packet | | | | | | | | |
| 22 | 88 | 2,222 | 462 | 8,822 | 22.73 | 2.50 | 2.00 | 0.50 |
| 22 | 88 | 2,222 | 142 | 8,502 | 22.73 | 2.00 | 2.00 | 0.50 |
| 22 | 88 | 2,222 | 126 | 8,486 | 22.73 | 2.50 | 2.00 | 0.50 |
| Long Preamble, 44 MHz 1500 Byte Packet | | | | | | | | |
| 22 | 88 | 2,222 | 528,110 | 536,470 | 22.73 | 2.50 | 2.00 | 0.50 |
| 22 | 88 | 2,222 | 48,110 | 56,470 | 22.73 | 2.50 | 2.00 | 0.50 |
| 22 | 88 | 2,222 | 24,110 | 32,470 | 22.73 | 2.50 | 2.00 | 0.50 |
| Short Preamble, 44 MHz 1 Byte Packet | | | | | | | | |
| 22 | 88 | 1,166 | 462 | 5,478 | 22.73 | 2.50 | 2.00 | 0.50 |
| 22 | 88 | 1,166 | 142 | 5,158 | 22.73 | 2.50 | 2.00 | 0.50 |
| 22 | 88 | 1,166 | 126 | 5,142 | 22.73 | 2.50 | 2.00 | 0.50 |
| Short Preamble, 44 MHz 1500 Byte Packet | | | | | | | | |
| 22 | 88 | 1,166 | 528,110 | 533,126 | 22.73 | 2.50 | 2.00 | 0.50 |
| 22 | 88 | 1,166 | 48,110 | 53,126 | 22.73 | 2.50 | 2.00 | 0.50 |
| 22 | 88 | 1,166 | 24,110 | 28,126 | 22.73 | 2.50 | 2.00 | 0.50 |
| Long Preamble, 88 MHz 1 Byte Packet | | | | | | | | |
| 44 | 176 | 4,444 | 924 | 17,644 | 11.36 | 2.50 | 2.00 | 0.50 |
| 44 | 176 | 4,444 | 284 | 17,004 | 11.36 | 2.50 | 2.00 | 0.50 |
| 44 | 176 | 4,444 | 252 | 16,972 | 11.36 | 2.50 | 2.00 | 0.50 |
| Long Preamble, 88 MHz 1500 Byte Packet | | | | | | | | |
| 44 | 175 | 4,444 | 1,056,220 | 1,072,940 | 11.36 | 2.50 | 2.00 | 0.50 |
| 44 | 176 | 4,444 | 96,220 | 112,940 | 11.36 | 2.50 | 2.00 | 0.50 |
| 44 | 176 | 4,444 | 48,220 | 64,940 | 11.36 | 2.50 | 2.00 | 0.50 |

TABLE 2-continued

Critical Time Summary

Short Preamble, 88 MHz 1 Byte Packet

| | | | | | | | |
|---|---|---|---|---|---|---|---|
| 44 | 176 | 2,332 | 924 | 10,955 | 11.36 | 2.50 | 2.00 | 0.50 |
| 44 | 176 | 2,332 | 284 | 10,316 | 11.36 | 2.50 | 2.00 | 0.50 |
| 44 | 176 | 2,332 | 252 | 10,284 | 11.36 | 2.50 | 2.00 | 0.50 |

Short Preamble, 88 MHZ 1500 Byte Packet

| 44 | 176 | 2,332 | 1,056,220 | 1,066,252 | 11.36 | 2.50 | 2.00 | 0.50 |
|---|---|---|---|---|---|---|---|---|
| 44 | 175 | 2,332 | 96,220 | 106,252 | 11.36 | 2.50 | 2.00 | 0.50 |
| 44 | 176 | 2,332 | 48,220 | 58,252 | 11.36 | 2.50 | 2.00 | 0.50 |

802 11a Preamble, 80 MHz 1 Byte Packet

| 40 | 160 | 520 | 307 | 1,747 | 12.50 | 2.50 | 2.00 | 0.50 |
|---|---|---|---|---|---|---|---|---|
| 40 | 160 | 520 | 281 | 1,658 | 12.50 | 2.50 | 2.00 | 0.50 |
| 40 | 160 | 520 | 212 | 1,652 | 12.50 | 2.50 | 2.00 | 0.50 |

802 11a Preamble, 80 MHz 1500 Byte Packet

| 40 | 160 | 520 | 160,200 | 161,640 | 12.50 | 2.50 | 2.00 | 0.50 |
|---|---|---|---|---|---|---|---|---|
| 40 | 160 | 520 | 26,867 | 28,307 | 12.50 | 2.50 | 2.00 | 0.50 |
| 40 | 160 | 520 | 17,978 | 19,418 | 12.50 | 2.50 | 2.00 | 0.50 |

| tpmbl (us) | thdr_su (us) | thdr (us) | tMPDU (us) | NMPDU (8) | R (Mbps) | TMIC_su (us) |
|---|---|---|---|---|---|---|

Long Preamble, 44 MHz 1 Byte Packet

| 144.00 | 1.00 | 48.00 | 8.00 | 1.00 | 1.00 | 2.00 |
|---|---|---|---|---|---|---|
| 144.00 | 1.00 | 48.00 | 0.73 | 1.00 | 11.00 | 2.00 |
| 144.00 | 1.00 | 48.00 | 0.36 | 1.00 | 22.00 | 2.00 |

Long Preamble, 44 MHz 1500 Byte Packet

| 144.00 | 1.00 | 48.00 | 12000.00 | 1500.00 | 1.00 | 2.00 |
|---|---|---|---|---|---|---|
| 144.00 | 1.00 | 48.00 | 1090.91 | 1500.00 | 11.00 | 2.00 |
| 144.00 | 1.00 | 48.00 | 545.45 | 1500.00 | 22.00 | 2.00 |

Short Preamble, 44 MHz 1 Byte Packet

| 92.00 | 1.00 | 24.00 | 8.00 | 1.00 | 1.00 | 2.00 |
|---|---|---|---|---|---|---|
| 92.00 | 1.00 | 24.00 | 0.73 | 1.00 | 11.00 | 2.00 |
| 92.00 | 1.00 | 24.00 | 0.36 | 1.00 | 22.00 | 2.00 |

Short Preamble, 44 MHz 1500 Byte Packet

| 92.00 | 1.00 | 24.00 | 12000.00 | 1500.00 | 1.00 | 2.00 |
|---|---|---|---|---|---|---|
| 92.00 | 1.00 | 24.00 | 1090.91 | 1500.00 | 11.00 | 2.00 |
| 92.00 | 1.00 | 24.00 | 545.45 | 1500.00 | 22.00 | 2.00 |

Long Preamble, 88 MHz 1 Byte Packet

| 144.00 | 1.00 | 48.00 | 8.00 | 1.00 | 1.00 | 2.00 |
|---|---|---|---|---|---|---|
| 144.00 | 1.00 | 48.00 | 0.73 | 1.00 | 11.00 | 2.00 |
| 144.00 | 1.00 | 48.00 | 0.36 | 1.00 | 22.00 | 2.00 |

Long Preamble, 88 MHz 1500 Byte Packet

| 144.00 | 1.00 | 48.00 | 12000.00 | 1500.00 | 1.00 | 2.00 |
|---|---|---|---|---|---|---|
| 144.00 | 1.00 | 48.00 | 1090.91 | 1500.00 | 11.00 | 2.00 |
| 144.00 | 1.00 | 48.00 | 545.45 | 1500.00 | 22.00 | 2.00 |

Short Preamble, 88 MHz 1 Byte Packet

| 92.00 | 1.00 | 24.00 | 8.00 | 1.00 | 1.00 | 2.00 |
|---|---|---|---|---|---|---|
| 92.00 | 1.00 | 24.00 | 0.73 | 1.00 | 11.00 | 2.00 |
| 92.00 | 1.00 | 24.00 | 0.36 | 1.00 | 22.00 | 2.00 |

Short Preamble, 88 MHz 1500 Byte Packet

| 92.00 | 1.00 | 24.00 | 12000.00 | 1500.00 | 1.00 | 2.00 |
|---|---|---|---|---|---|---|
| 92.00 | 1.00 | 24.00 | 1090.91 | 1500.00 | 11.00 | 2.00 |
| 92.00 | 1.00 | 24.00 | 545.45 | 1500.00 | 22.00 | 2.00 |

802 11a Preamble, 80 MHz 1 Byte Packet

| 16.00 | 1.00 | 4.00 | 1.33 | 100 | 6.00 | 2.00 |
|---|---|---|---|---|---|---|
| 16.00 | 1.00 | 4.00 | 0.22 | 1.00 | 36.00 | 2.00 |
| 16.00 | 1.00 | 4.00 | 0.15 | 1.00 | 5400 | 2.00 |

802 11a Preamble, 80 MHz 1500 Byte Packet

| 16.00 | 1.00 | 4.00 | 2000.00 | 1500.00 | 6.00 | 2.00 |
|---|---|---|---|---|---|---|
| 16.00 | 1.00 | 4.00 | 333.33 | 150000 | 36.00 | 2.00 |
| 16.00 | 1.00 | 4.00 | 222.22 | 150000 | 54.03 | 2.00 |

In view of the above, it can be seen the present invention presents a significant advancement in the art of high-speed wireless local area networks that support QoS based on the IEEE 802.11e standard. In view of the foregoing descriptions, it should be apparent that the present invention also represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of generating an outgoing frame in response to an incoming frame, said method comprising:

beginning reception of the incoming frame comprised of components including a physical layer convergence protocol (PLCP) preamble and a physical layer convergence protocol (PLCP) header, followed by a medium access control (MAC) Protocol Data Unit (MPDU):

processing the incoming frame at a medium access control (MAC) layer while the incoming frame is being received by providing a TRANSMIT-ENABLE register configured to store a transmit radio enable bit, a transmit preamble enable bit, a transmit header enable bit, a transmit medium access control (MAC) Protocol Data Unit (MPDU) enable bit, and an optional transmit Message Integrity Check (MIC) enable bit, wherein the transmit radio enable bit indicates that a transmit is being initiated, the transmit preamble enable bit indicates a transmission of the preamble should begin subsequent to expiration of a short interframe spacing (SIFS) timer, the transmit header enable bit indicates that all values required to properly format the physical layer convergence protocol (PLCP) header have been loaded into the transmit registers, the transmit MPDU enable bit indicates that remaining transmit values have been loaded into the transmit registers including a pointer to the MPDU data to be transmitted, and the optional transmit Message Integrity Check (MIC) enable bit indicates that a valid Message Integrity Check value is available in memory;

initiating transmission of some outgoing frame components before determination of all parameters associated with all components of the outgoing frame has been concluded including initiating preamble transmission associated with the outgoing frame subsequent to a short interframe spacing (SIFS) time associated with the incoming frame upon a determination that a frame response to the frame is required:

determining some component parameters associated with the outgoing frame while other components of the outgoing frame are being transmitted.

2. A method of generating an outgoing frame in response to an incoming frame, said method comprising:

beginning reception of the incoming frame comprised of components including a physical layer convergence protocol (PLCP) preamble and a physical layer convergence protocol (PLCP) header, followed by a medium access control (MAC) Protocol Data Unit (MPDU):

processing the incoming frame at a medium access control (MAC) layer while the incoming frame is being received by providing a TRANSMIT-ENABLE register configured to store transmit radio enable bit, a transmit preamble enable bit, a transmit header enable bit, and a transmit medium access control (MAC) Protocol Data Unit (MPDU) enable bit, wherein the transmit radio enable bit indicates that a transmit is being initiated, the transmit preamble enable bit indicates a transmission of the preamble should begin subsequent to expiration of an short interframe spacing (SIFS) timer, the transmit header enable bit indicates that all values required to properly format the physical layer convergence protocol (PLCP) header have been loaded into the transmit registers, and the transmit MPDU enable bit indicates that remaining transmit values have been loaded into the transmit registers including a pointer to the MPDU data to be transmitted;

initiating transmission of some outgoing frame components before determination of all parameters associated with all components of the outgoing frame has been concluded including initiating preamble transmission associated with the outgoing frame subsequent to a short interframe spacing (SIFS) time associated with the incoming frame upon a determination that a frame response to the frame is required;

determining some component parameters associated with the outgoing frame while other components of the outgoing frame are being transmitted.

3. The method according to claim 2, wherein processing the incoming frame further comprising:

reading an incoming frame control field upon receipt of a medium access control (MAC) interrupt;

determining if the incoming frame is of "reserved" subtype;

disabling an automatic acknowledge bit when the incoming frame is of subtype data Quality of Service (QoS);

reading a QoS control field to determine whether a response is required; and setting the transmit radio enable bit in the TRANSMIT-ENABLE register to enable transmission of a response signal upon a determination that a response is required.

4. The method according to claim 3, wherein processing the incoming frame further comprising:

determining a peer station preamble capability associated with the incoming frame control field;

writing a predetermined bit in the PREAMBLE-SELECT register to indicate a preamble type; and setting the transmit preamble enable bit in the TRANSMIT-ENABLE register to indicate whether the predetermined bit in the PREAMBLE-SELECT register indicates a short or long preamble, and to enable response signal transmission of an appropriate frame preamble at an SIFS boundary.

5. The method according to claim 4, wherein processing the incoming frame further comprising:

writing frame header values (transmission rate, frame length and service) into predetermined bits of the transmit registers to properly format a physical layer header; and setting the transmit preamble enable bit in the TRANSMIT-ENABLE register to indicate that all values have been loaded into the transmit registers that are required to properly format the physical layer header.

6. The method according to claim 5, wherein processing the incoming frame further comprising:

writing the remaining transmit registers to conform with normal packet transmission; and setting the transmit medium access control (MAC) Protocol Data Unit (MPDU) enable bit to start transmission of the MPDU.

7. The method according to claim 6 wherein processing the incoming frame further comprising:
  determining a Message Integrity Check (MIC) value to conform to Institute of Electrical and Electronics Engineers Standard IEEE STD 802.11i; and
  setting the optional transmit MIC enable bit upon determining a valid MIC value is available.

8. A method of generating an outgoing Quality of Service QoS frame in response to an incoming QoS frame, said method comprising:
  processing the incoming frame at a medium access control (MAC) layer while the incoming frame is being received comprising:
  determining a plurality of physical layer convercience protocol (PLCP) header parameters associated with a final outgoing frame subsequent to initiating a preamble transmission associated with the outgoing frame such that the plurality of PLCP header parameters associated with the final outgoing frame are determined prior to a point in time when the plurality of PLCP header parameters are required for transmission;
  determining a plurality of medium access control (MAC) Protocol Data Unit (MPDU) parameters associated with the final outgoing frame subsequent to initiating the preamble transmission, such that the MPDU parameters associated with the final outgoing frame are determined prior to a point in time when the plurality of medium access control (MAC) Protocol Data Unit (MPDU) parameters are required for transmission;
  initiating the preamble transmission associated with the outgoing frame prior to final outgoing Quality of Service (QoS) frame selection upon a determination that a frame response to the QoS frame is required.

9. The method according to claim 8, wherein the MPDU parameters associated with the final outgoing frame are determined during transmission of the preamble associated with the final outgoing frame.

10. The method according to claim 8, wherein the MPDU parameters associated with the final outgoing frame are determined during transmission of the PLCP header parameters associated with the final outgoing frame.

11. The method according to claim 8, wherein the MPDU parameters associated with the final outgoing frame are determined during transmission of the preamble and the PLCP header parameters associated with the final outgoing frame.

12. The method according to claim 8, wherein processing the incoming frame further comprising:
  providing a TRANSMIT-ENABLE register configured to store a transmit radio enable bit, a transmit preamble enable bit, a transmit header enable bit, and a transmit medium access control (MAC) Protocol Data Unit (MPDU) enable bit, wherein the transmit radio enable bit indicates that a transmit is being initiated, the transmit preamble enable bit indicates when transmission of the preamble should begin subsequent to expiration of a short interframe spacing (SIFS) timer, the transmit header enable bit indicates that all values required to properly format a physical layer header have been loaded into the transmit registers, and the transmit MPDU enable bit indicates that remaining MPDU-specific transmit values have been loaded into the transmit registers including a pointer to the MPDU data to be transmitted.

13. The method according to claim 12, wherein the TRANSMIT-ENABLE register is configured to store a transmit (MIC) Message Integrity Check enable bit, and wherein the transmit Message Integrity Check MIC enable bit indicates that a valid Message Integrity Check value is available in memory.

14. The method according to claim 13 wherein processing an incoming frame further comprising:
  determining a Message Integrity Check (MIC) value to conform to IEEE Standard 802.11i; and
  setting the optional transmit MIC enable bit upon determining a valid MIC value is available.

15. The method according to claim 12 wherein processing the incoming frame further comprising:
  reading an incoming frame control field upon receipt of a medium access control (MAC) interrupt;
  determining if the incoming frame is of "reserved" subtype;
  disabling an automatic acknowledge bit when the incoming frame is of subtype data Quality of Service (QoS);
  reading a QoS control field to determine whether a response is required; and
  setting the transmit radio enable bit in the TRANSMIT-ENABLE register to enable transmission of a response signal upon a determination that a response is required.

16. The method according to claim 15 wherein processing the incoming frame further comprising:
  determining a peer station preamble capability associated with the incoming frame control field;
  writing a predetermined bit in the PREAMBLE-SELECT register to indicate a preamble type; and
  setting the transmit preamble enable bit in the TRANSMIT-ENABLE register to indicate whether the predetermined bit in the PREAMBLE-SELECT register indicates a short or long preamble, and to enable response signal transmission of an appropriate frame preamble at an SIFS boundary.

17. The method according to claim 16 wherein processing the incoming frame further comprising:
  writing MPDU specific values (signal, length and service) into predetermined bits of the
  transmit registers to properly format a physical layer header; and
  setting the transmit preamble enable bit in the TRANSMIT-ENABLE register to indicate that all values have been loaded into the transmit registers that are required to properly format the physical layer header.

18. The method according to claim 17 wherein processing the incoming frame further comprising:
  writing the remaining transmit registers to conform with normal packet transmission; and
  setting the transmit MPDU enable bit to start transmission of the MPDU.

* * * * *